June 5, 1945.  C. H. GEMBERLING  2,377,686
TRACTOR DUMP RAKE
Filed May 14, 1943  4 Sheets-Sheet 2
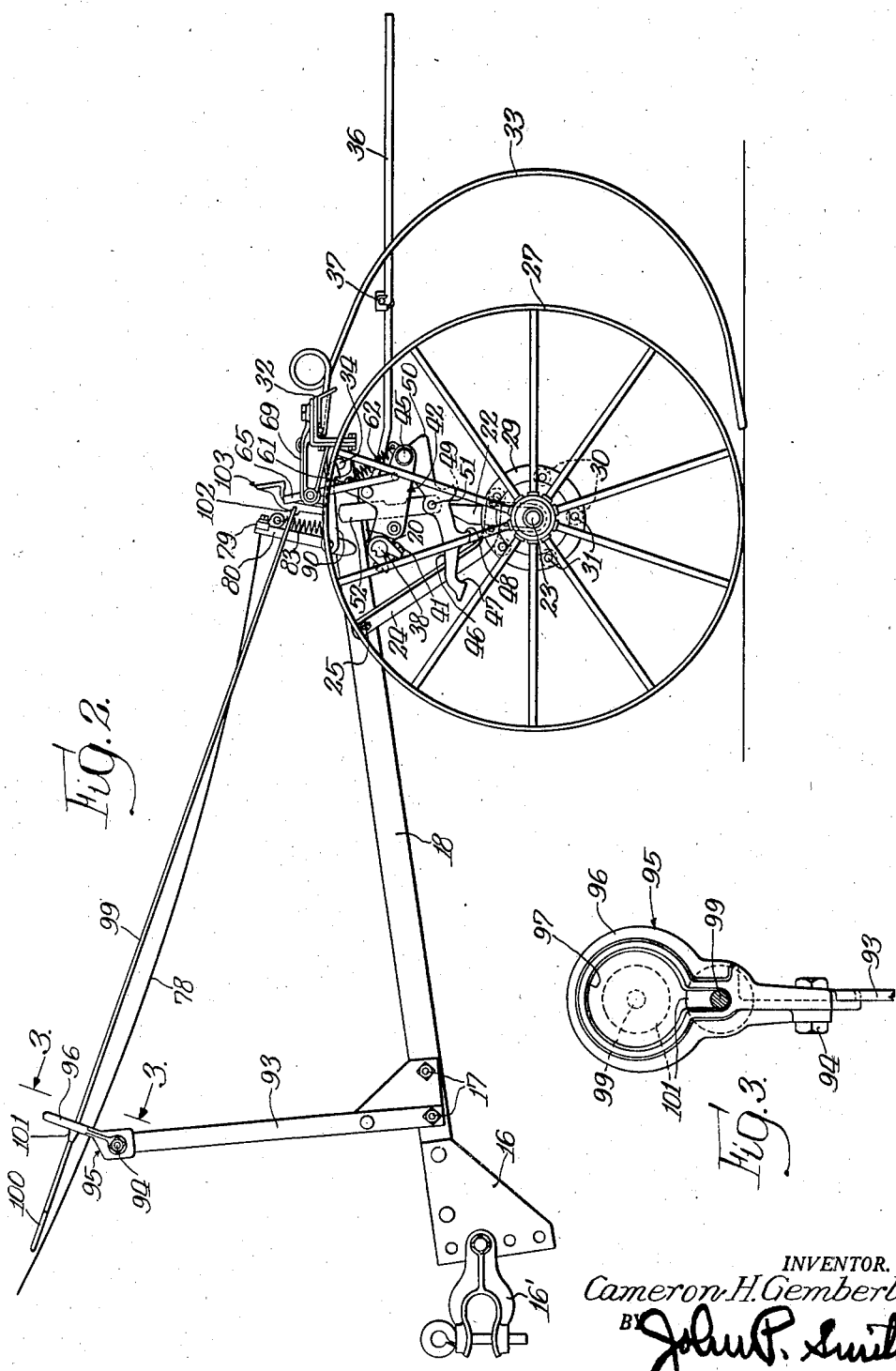
INVENTOR.
Cameron H. Gemberling,
BY John P. Smith
Atty.

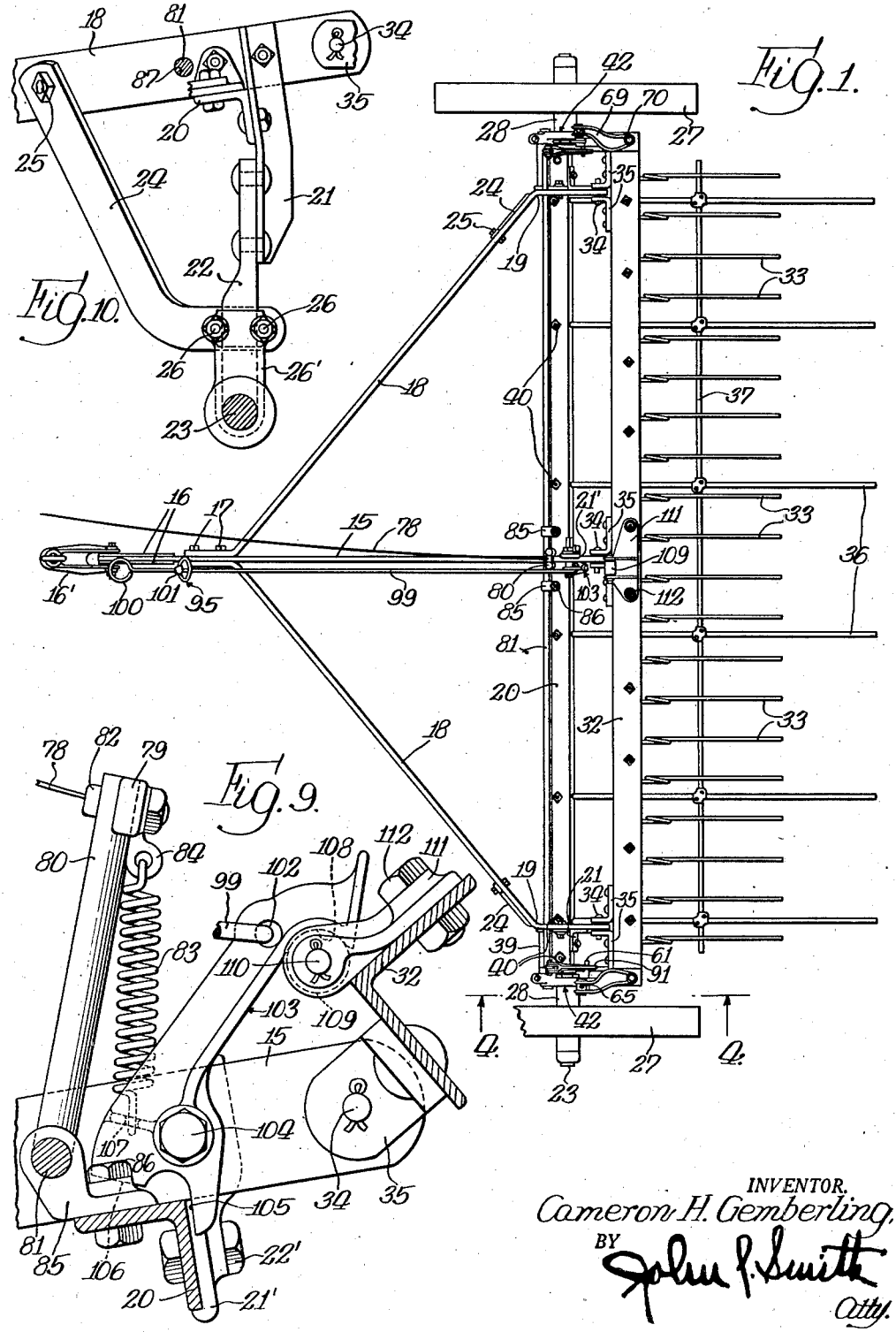

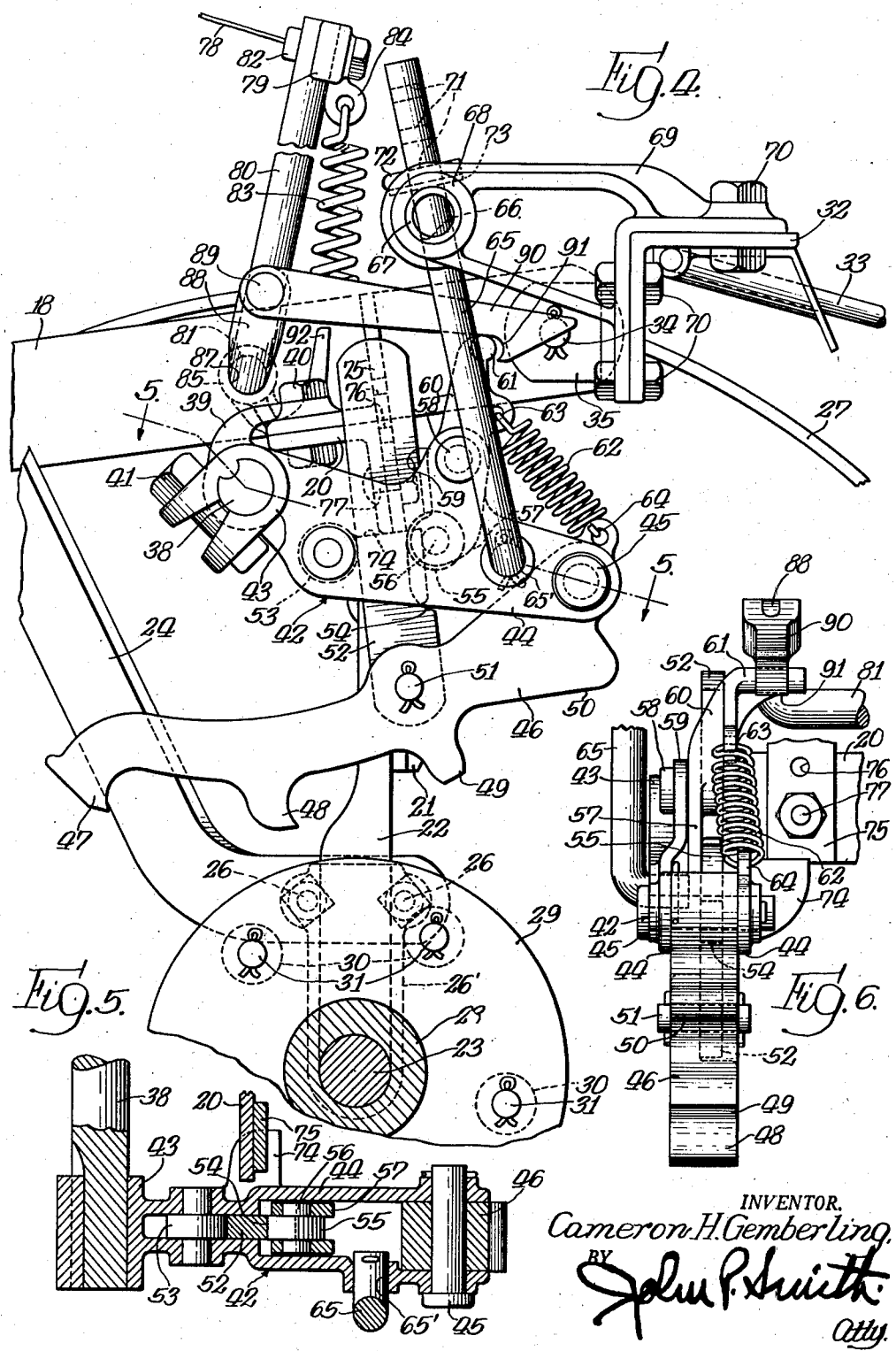

June 5, 1945. C. H. GEMBERLING 2,377,686
TRACTOR DUMP RAKE
Filed May 14, 1943 4 Sheets-Sheet 4

INVENTOR.
Cameron H. Gemberling
BY John P. Smith
atty.

Patented June 5, 1945

2,377,686

UNITED STATES PATENT OFFICE 2,377,686

TRACTOR DUMP RAKE

Cameron H. Gemberling, South Bend, Ind., assignor to The Oliver Corporation, a corporation of Delaware Application May 14, 1943, Serial No. 487,047

6 Claims. (Cl. 56—392)

The present invention relates generally to dump rakes, but more particularly to a novel and improved type of tractor drawn dump rake in which means are provided for controlling the complete operation and manipulation of the dump frame of the rake from the operator's seat on the tractor.

Another object of the invention is to provide a novel and improved construction of tractor drawn dump rake in which all of the controls are operable from the operator's seat on the tractor, such as the trip for connecting the power drive or power lift mechanism of the traction wheels on the dump rake with the dump frame to actuate the same and subsequently return it to its normal raking position.

A further object of the invention is to provide a novel and improved tractor drawn dump rake in which means are not only provided for controlling the actuation of the dump frame at the will of the operator, but also means within the control of the operator on the tractor to hold the dump frame in elevated position for turning at the ends of the field or for the purpose of transporting the rake proper.

A still further object of the invention is to provide a novel and improved type of tractor drawn dump rake which is simple in construction, efficient in operation and one in which the supporting wheels thereof are approximately one-half the diameter of the conventional dump rake wheels, thereby permitting the employment of the conventional type agricultural implement wheels or similar wheels which will permit the use of discarded automobile tires.

These and other objects are accomplished by providing a construction and an arrangement of the various parts in the manner hereinafter described and particularly pointed out in the appended claims.

Referring to the drawings:

Fig. 1 is a top plan view of my improved tractor drawn and tractor controlled dump rake;

Fig. 2 is a side elevational view of the same;

Fig. 3 is an enlarged cross sectional view taken on the line 3—3 in Fig. 2;

Fig. 4 is an enlarged cross sectional view taken on the line 4—4 in Fig. 1;

Fig. 5 is a cross sectional view taken on the line 5—5 in Fig. 4;

Fig. 6 is a rear elevational view of a portion of the trip and power lift mechanism shown in Fig. 4;

Fig. 9 is a cross sectional view similar to that shown in Fig. 8, showing the dump frame elevated and locked in its raised or inoperative position; and Fig. 10 is a fragmentary end elevational view showing the manner in which the supporting wheels are attached to the main frame.

Figure 7:
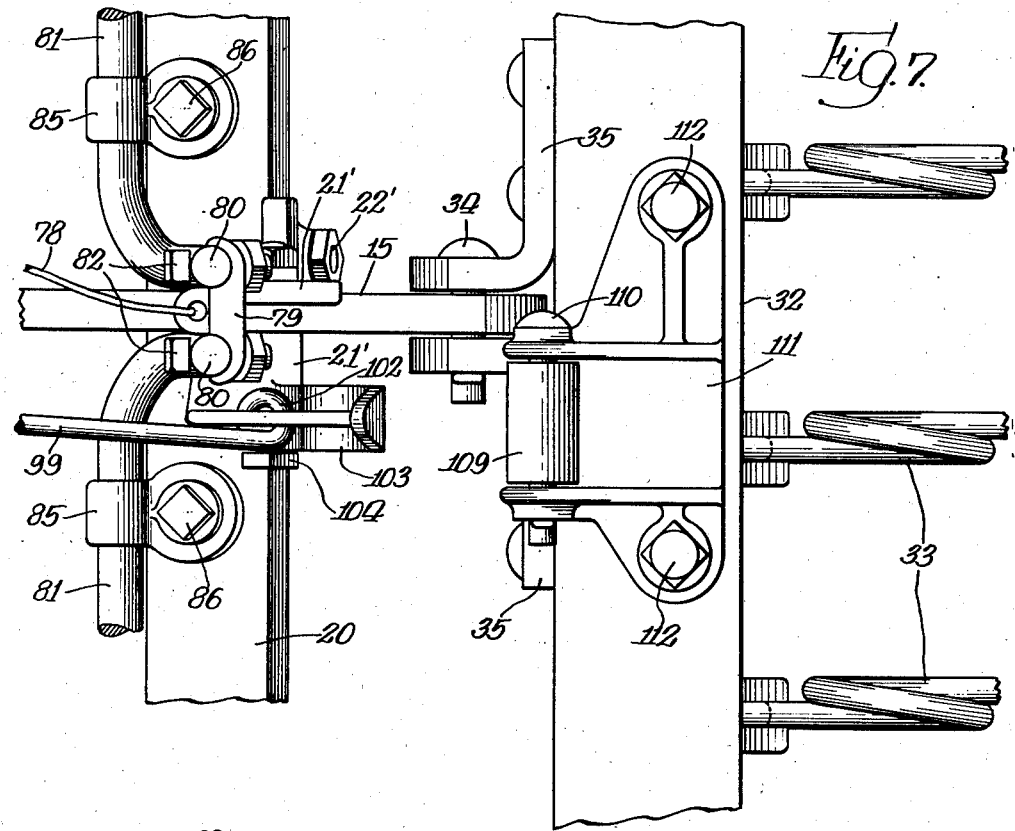
Fig. 7 is a fragmentary top plan view showing the hinge arrangement between the main frame and dump frame and associated parts.

In illustrating one form my invention may assume in practice, I have shown the tractor drawn dump rake as comprising a main frame construction which includes a longitudinally extending draw bar or main frame member 15. To the forward end of said main frame member 15 is attached spaced apart draw bar plates 16. Adjustably connected to the plates 16 is the usual draft clevis 16' for attaching the dump rake to the draw bar of the tractor. Secured adjacent the forward end of the main frame member 15 by means of bolts 17 are rearwardly diverging supplemental main frame members and braces 18. The rearward ends of the supplemental frame members 18 are bent as shown at 19 so as to extend parallel in a rearward direction. Secured adjacent the rear ends of the main frame member 15 and supplemental main frame members 18 is a transverse angle main frame member 20. The main frame member 15 is secured to the transverse frame member 20 by a bracket 21' and bolts 22'. The rear ends of the diagonal or supplemental frame members 18 are secured to transverse angle member 20 by vertical angle brackets 21. Secured to the lower end of each of the angle brackets 21 are vertical shanks 22 of each of the horizontal axles 23. Each of the axles 23 are reinforced by axle brace bars 24 which have their upper ends secured as shown at 25 to each of the supplemental frame members 18 and their lower ends secured by means of bolts 26 to axle brackets 26'. The dump rake is supported on two oppositely disposed wheels 27, which in turn, are journaled on the respective axles 23. The wheels in this instance are relatively small wheels, being substantially one-half of the diameter of the wheels heretofore used on horse drawn rakes. The wheels in this instance are provided with a hub construction, as shown at 28. Formed integrally with these hubs 28 are discs or pinions 29. These discs or pinions are provided with five equally spaced apart rollers 30, which in turn, are journaled on pins 31 supported in the disc 29. These pinions are connected to each of the wheels and are adapted to engage racks located on each side of the rake for supplying the power to raise the dump frame in the manner hereinafter described.

The dump or rake frame which is pivoted to the main frame will next be described. This dump frame comprises a transverse angle frame member 32 which has secured thereto at uniformly spaced intervals the usual curved rake teeth 33. This dump frame is pivotally attached to the main frame member 15 and supplemental main frame members 18 by hinge pins 34 and hinge brackets 35 as clearly shown in Figs. 1 and 2 of the drawings. The brackets 35 are secured to frame member 32 at spaced intervals. The dump rake is provided with the usual rearwardly extending and parallel cleaner bars 36 which have their forward ends secured to the main frame angle member 20. The intermediate portions of these bars are braced or secured together by a transverse brace bar 37.

The mechanism for furnishing the power to actuate or lift the dump frame and the different controls therefor will next be described. This power lift mechanism, of which there are two in number, one located adjacent each of the wheels, includes stub shafts 38 journaled in bearing brackets 39, which in turn, are bolted to the opposite ends of the transverse frame member 20 and supplemental main frame members 18 by means of bolts 40. Rigidly secured to the outer ends of each of the stub shafts 38 by means of keys and clamping bolts 41 are rack supports, generally indicated by the reference character 42. These rack support members 42 have hub portions as shown at 43 which embraces and rigidly secures each support to its respective stub shaft 38. Formed integrally with the hub portion 43 of each support 42 are two laterally spaced apart walls or arms as shown at 44. Pivoted to the free ends of and between the arms 44 of each of the supports 42, by means of a pin 45, are racks 46. The racks 46 extend forwardly and are provided on their lower sides with spaced apart teeth 47, 48 and 49 which are adapted to successively move into the path of and be engaged by the rollers 30 of each of the respective pinions 29 during the operation of lifting the dump frame from its lowermost position to its uppermost position in the manner hereinafter described.

Located adjacent the rear ends of each of the racks 46 are cam portions 50 which are adapted to engage one of the rollers 30 of the respective cooperating pinions 29 to disengage the racks from the pinions at the conclusion of the dumping operation. Pivoted to an intermediate portion of each of the racks 46 on a pin 51 is a hold-up bar 52. The upper end of each of the bars 52 extends through and is guided between the vertical arms 44 of each of the respective rack supports 42 by means of a roller 53. An intermediate portion of each of the hold-up bars 52 is provided with a cut out portion or notch 54 in which is adapted to be seated a roller 55 journaled on a pin 56 mounted in the lower ends of each of the roller brackets or levers 57. The pin 58 is mounted in two spaced apart apertured ears 59 formed integrally with the opposite arms 44 of each of the rack supports 42. It will be obvious from the above description that the rollers 55 of each of the roller brackets 57 are adapted to engage the respective notches 54 of each of the hold-up bars 52 for the purpose of normally holding the racks 46 disengaged from the respective pinions 29. Formed integrally with each of the roller brackets 57 is an upwardly extending arm 60. Formed integrally with and extending laterally with respect to the upper ends of each of the arms 60 of the roller brackets 57 are laterally projecting latch lugs 61. Each of these lugs are located in the path of a hook for controlling the release of the respective racks 46 in the manner hereinafter more fully described. The roller brackets 57 are actuated in a clockwise direction as viewed in Fig. 4 of the drawings, by springs 62. The upper end of each of the springs 62 is connected as shown at 63 to an apertured ear formed on the upper arm 60 of the roller bracket 57. The lower end of the spring 62 is connected, as shown at 64, to an apertured ear formed on the free end of one of the arms 44 of the rack support 42.

The traction or power lift action derived from the supporting wheels 27 is transmitted through the pinions 29, racks 46, rack supports 42, to the dump frame of the rake by means of connections or rods 65 which have their lower ends bent at right angles to pivotally engage apertures 65' formed in the rack supports 42. The upper ends of the connecting rods 65 slidably extend through apertures 66 formed in pipes or swivel sleeves 67. Each of these pipes 67 is oscillatably mounted in two apertured and spaced apart bearing ears 68 formed on the forward ends of each of the crank arms 69. Crank arms 69 are located adjacent the opposite ends of and secured to the dump frame angle member 32 by means of bolts 70. The upper ends of each of the rods 65 are provided with a plurality of spaced apart apertures 71 which are adapted to adjustably receive a cotter pin 72. A washer 73 is positioned between each of the cotter pins 72 and the respective transverse pipes 67.

From the above description it will be observed that the cotter pins 72 may be adjusted in the various apertures in the connecting rods 65 so that when the operator desires to raise the rake teeth to different elevations during the dumping operation, such, for example, when a heavy crop of hay is being raked, a shortening of the connections between the rack supports 42 and the crank brackets 69 will cause the rake to be actuated to a higher elevation to take care of the heavier crop.

The lowermost position of the dump frame and the forward position of the lower end of the rake teeth 33 is controlled by an adjustable stop which includes a laterally projecting lug 74 formed integrally with one of the arms 44 of each of the rack supports 42. This lug 74 is adapted to move into the path of and engage the lower end of an adjustable stop or bar 75. The adjustable bar 75 is provided with a plurality of spaced apertures 76 so that a bolt 77 may be inserted in any one of these apertures for adjustably securing the stop 75 to the main frame angle member 20. The position of these stops 75, together with the adjustment of the rods 65 control the downward position of the dump frame with respect to the main frame of the dump rake. In this connection it will also be observed that the weight of the rake teeth and dump frame, as a whole, exerts an upward pull on the connecting rods 65 and is so arranged as to normally and automatically return the dump frame to raking or down position at the completion of the cycle of the dumping operation.

The control from the operator's seat on the tractor for connecting the supporting wheels of the dump rake with the power lift to actuate or dump the dump frame will next be described. This mechanism includes trip rope or cord 78 which extends within easy reach of the operator's seat on the tractor and is supported in said position in the manner hereinafter described. The rearward end of the trip cord 78 is connected to a tie bar 79, which in turn, has its opposite ends rigidly secured to the upper ends of the crank arms 80 formed on the inner ends of the trip rods 81. The tie bar 79 is secured to the crank arms 80 by bolts 82. The trip rods 81 and their cranks 80 are actuated in a clockwise direction as viewed in Fig. 4 of the drawings by an extension spring 83. The upper end of the spring 83 is connected to an apertured eye 84, which in turn, is secured to the upper end of one of the cranks 80 by one of the bolts 82. The lower end of the spring 83 is connected to a latch for locking the dump frame in raised or inoperative position, the construction or operation of which will be hereinafter described. The inner ends of each of the trip rods 81 are journaled in bearing brackets 85, which in turn, are secured by means of bolts 86 to the transverse main frame member 20. The outer ends of the respective trip rods 81 are journaled in bores or apertures 87 formed in the supplemental frame members 18. The outer ends of each of these trip levers 81 are provided with relatively short crank portions 88 which extend parallel to the inner cranks 80 thereof and are pivotally connected as shown at 89 to trip hooks 90. These trip hooks 90 have hook portions as shown at 91 which move into the path of and are adapted to engage the laterally projecting lugs 61 formed on the upper ends of each of the roller brackets 57. The hook members 90 are limited in their downward movement by upwardly extending lugs 92 formed integrally with the brackets 39.

Figure 8:
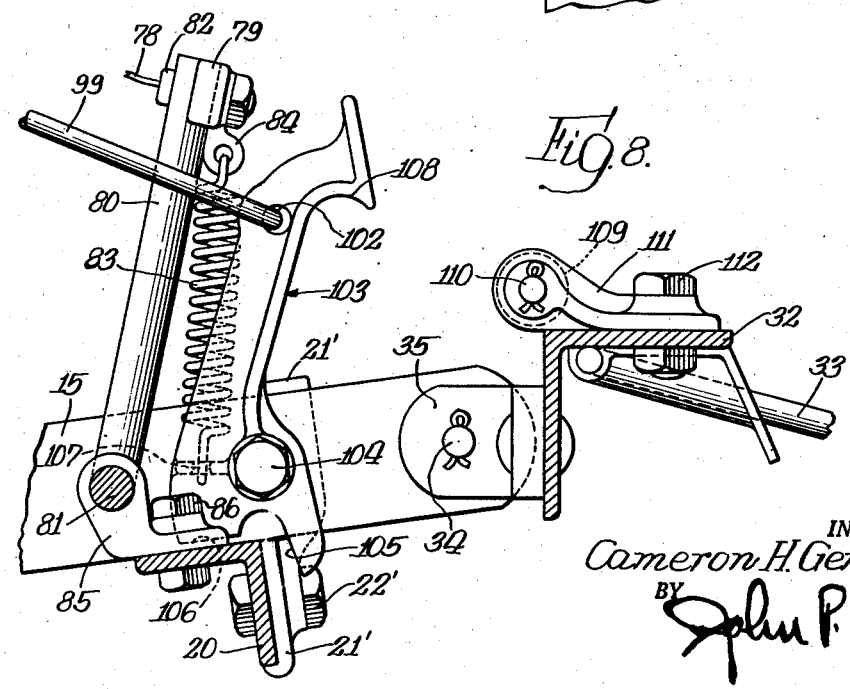
Fig. 8 is a cross sectional elevational view of the construction of the parts shown in Fig. 7 of the drawings with the dump rake in its lowered or operative position.

The mechanism for holding the dump frame in elevated or inoperative position and its control therefor from the operator's seat on the tractor will next be described. This mechanism includes a vertical support or bar which is secured adjacent the forward end and to one side of one of the supplemental frame members 18 by the bolts 17. Secured to the upper ends of the bar 93 by means of a bolt 94 is a control rod bracket 95. This control rod bracket 95 consists of an angularly disposed circular ring 96 forming an axial opening 97. The lower portion of the circular opening communicates with a downwardly extending slot 98 so as to form in effect an exaggerated key hole slot. Seated in the slot 98 of the bracket 95 is a control rod 99, the forward end of which is provided with an eye 100 located within easy reach of the operator on the tractor. Positioned adjacent the ring 100 is a conically shaped lug or stop 101 whose largest diameter is sufficiently small to pass through the ring 96, but when withdrawn forwardly and lowered into the slotted opening 98 of the bracket 95, will lock the control rod 99 in the position shown in Fig. 2 of the drawings. The rearward end of the control rod is pivoted, as shown at 102, to a hang-up hook or latch generally indicated by the reference character 103. The hang-up hook 103 is pivotally attached to a shoulder bolt 104 mounted in threaded engagement with the bracket 21'. Formed integrally with the hang-up hook 103 and extending below the pin 104 is a stop lug, as shown at 105, which is adapted to engage the main frame angle member 20 in limiting the clockwise movement of the latch 103 as viewed in Figs. 8 and 9 of the drawings. The forward movement of the hang-up hook 103 is limited by another stop portion 106 formed integrally therewith and adapted to engage the upper surface of the main frame member 20. The latch is normally actuated rearwardly by the extension spring 83 having its lower end connected as shown at 107 to an apertured ear formed on the hang-up hook 103. The upper or free end of the hook 103 has a hook portion, as shown at 108, which is located in the path of and adapted to engage a roller 109 journaled on a pin 110 carried by a bracket 111. The bracket 111 is secured to the dump frame member 32 by means of bolts 112.

Summarizing the advantages and novel features of operation, let us assume that the rake is being drawn by a tractor and the operative parts are in the position shown in Figs. 1 and 2 of the drawings. When sufficient hay has been accumulated by the rake and the operator desires to dump the hay thus accumulated, the rope or cord 78 is pulled forwardly from the operator's seat on the tractor, thereby actuating the two cranks 80 of each of the trip rods 81 forwardly. This action, in turn, pulls the trip hooks 90 forwardly, causing the roller brackets 57 to be actuated in a counterclockwise direction as viewed from Fig. 4 of the drawings, to thereby release the rollers 55 from their respective notches 54 in each of the hang up bars 52. As the hang up bars 52 are released, the racks 46 drop downwardly so that the lugs or teeth 47 and 48 and 49 successively engage the rollers 30 on each of the respective pinions 29, causing the rack support levers 42 to be actuated downwardly about their respective stub shafts 38. The movement of the support levers 42 are transmitted to the connecting rods 65 and crank brackets 69, to, in turn, actuate the dump frame about their hinged pivots 34 on the main frame. This dumping movement continues until such time or until the cams 50 formed on the rear end of each of the racks 46 engages one of the rollers 30 of each of the pinions 29 to thereby release the racks from the pinions and automatically return the dump frame to its raking position. It will be observed that the position of the teeth may be changed, that is, moved forwardly or backwardly with respect to the main frame by adjusting the stop 75 with respect to the main frame member 20. When such adjustment is made, it may be also made in connection with another adjustment by means of which the elevation of the teeth in each dumping action may be changed by changing the position of the cotter pins in any one of a number of apertures 71 in the connecting rods 65.

Should the operator desire to lock the dump frame in its elevated or inoperative position, this may be accomplished from the operator's seat on the tractor during the dumping operation or at any time that the operator desires, so that the dump frame may be held in inoperative position while the rake is being turned at the end of the field or is being transported to or from the field. This is accomplished by releasing the control rod 99, or more particularly the lug 101 attached thereon from the slot 98 in the control bracket 95 by permitting the lug 101 to be moved rearwardly through the opening 97 and the ring 96, thereby releasing the hold-up hook 103 so that the same will be in position to engage and latch the roller 109 as shown in Fig. 9 of the drawings, When in this position, the dump frame is locked in its elevated or inoperative position. Obviously, when the operator desires to release or lower the dump frame from its inoperative position, the control rod may be pulled forwardly and the latch or hang up hook 103 rendered inoperative by locking the lug 101 of the control rod 99 in the position shown in Figs. 2 and 3 of the drawings.

From the above description it will be seen that I have provided not only a very simple and efficient tractor drawn dump rake, but one in which all the controls may be manipulated from the operator's seat on the tractor, thereby eliminating the necessity of mounting and dismounting from the tractor to accomplish these functions. It will also be obvious that the rake is provided with a variety of adjustments which take care of varying conditions of the crop. This novel construction of dump rake also permits the use of standard size implement wheels so that discarded automobile tires may be used for the conventional tire wheel.

While in the above specification I have described one form for which my invention may assume in practice, it will, of course, be understood that the same is capable of modification and that modification may be made without departing from the spirit and scope of the invention as expressed in the following claims:

What I claim as my invention and desire to secure by Letters Patent is:

1. A tractor drawn dump rake comprising a main frame, wheels for supporting said main frame, a dump frame hinged to said main frame, pinions carried by said wheels, rack supports pivoted to said main frame, racks pivoted to said supports and adapted to engage said pinions, hold-up bars pivoted to said racks and slidably connected with said support, roller brackets pivoted to said support and adapted to engage said hold-up bars for holding said racks out of engagement with said pinions, and means for actuating said roller brackets to lower said racks into engagement with said pinions.

2. A tractor drawn dump rake comprising a main frame, wheels for supporting said main frame, a dump frame hinged to said main frame, pinions carried by said wheels, rack supports pivoted to said main frame, racks pivoted to said supports and adapted to engage said pinions, hold-up bars pivoted to said racks and slidably connected with said support, roller brackets pivoted to said support and adapted to engage said hold-up bars for holding said racks out of engagement with said pinions, and trip latches controllable from the operator's seat on the tractor and engageable with said roller brackets for releasing said racks into engagement with said pinions.

3. A tractor drawn dump rake comprising a main frame, wheels for supporting said main frame, a dump frame hinged to said main frame, pinions carried by said wheels, rack supports pivoted to said main frame, racks pivoted to said supports and adapted to engage said pinions, hold-up bars pivoted to said racks and slidably connected with said support, roller brackets pivoted to said support and adapted to engage said hold-up bars for holding said racks out of engagement with said pinions, trip latches controllable from the operator's seat on the tractor and engageable with said roller brackets for releasing said racks into engagement with said pinion for raising said dump frame, and means carried by said main frame and operable from the operator's seat on the tractor for locking said dump frame in raised position.

4. A tractor drawn dump rake comprising a main frame, wheels for supporting said main frame, a dump frame hinged to said main frame, pinions carried by said wheels, rack supports pivoted to said main frame, racks pivoted to said supports and adapted to engage said pinions, hold-up bars pivoted to said racks and slidably connected with said support, roller brackets pivoted to said support and adapted to engage said hold-up bars for holding said racks out of engagement with said pinions, trip latches controllable from the operator's seat on the tractor and engageable with said roller brackets for releasing said racks into engagement with said pinion for raising said dump frame, and a latch carried by said main frame and controllable from the operator's seat on the tractor for locking said dump frame in elevated position.

5. A tractor drawn dump rake comprising a main frame, wheels for supporting said main frame, a dump frame hinged to said main frame, pinions carried by said wheels, rack supports pivoted to said main frame, racks pivoted to said supports and adapted to engage said pinions, hold-up bars pivoted to said racks and slidably connected with said support, roller brackets pivoted to said support and adapted to engage said hold-up bars for holding said racks out of engagement with said pinions, trip latches controllable from the operator's seat on the tractor and engageable with said roller brackets for releasing said racks into engagement with said pinions, and adjustable stop bars carried by said main frame and engageable with said supports for varying the limit of upward movement of said dump frame with respect to said main frame.

6. A tractor drawn dump rake comprising a main frame, wheels for supporting said main frame, a dump frame hinged to said main frame, pinions carried by said wheels, rack supports pivoted to said main frame, racks pivoted to said supports and adapted to engage said pinions, hold-up bars pivoted to said racks and slidably connected with said support, roller brackets pivoted to said support and adapted to engage said hold-up bars for holding said racks out of engagement with said pinions, trip latches controllable from the operator's seat on the tractor and engageable with said roller brackets for releasing said racks into engagement with said pinion for raising said dump frame, a latch carried by said main frame and controllable from the operator's seat on the tractor for locking said dump frame in elevated position, and adjustable stop bars carried by said main frame and engageable with said supports for varying the limit of upward movement of said dump frame with respect to said main frame.

CAMERON H. GEMBERLING.